Patented Feb. 11, 1941

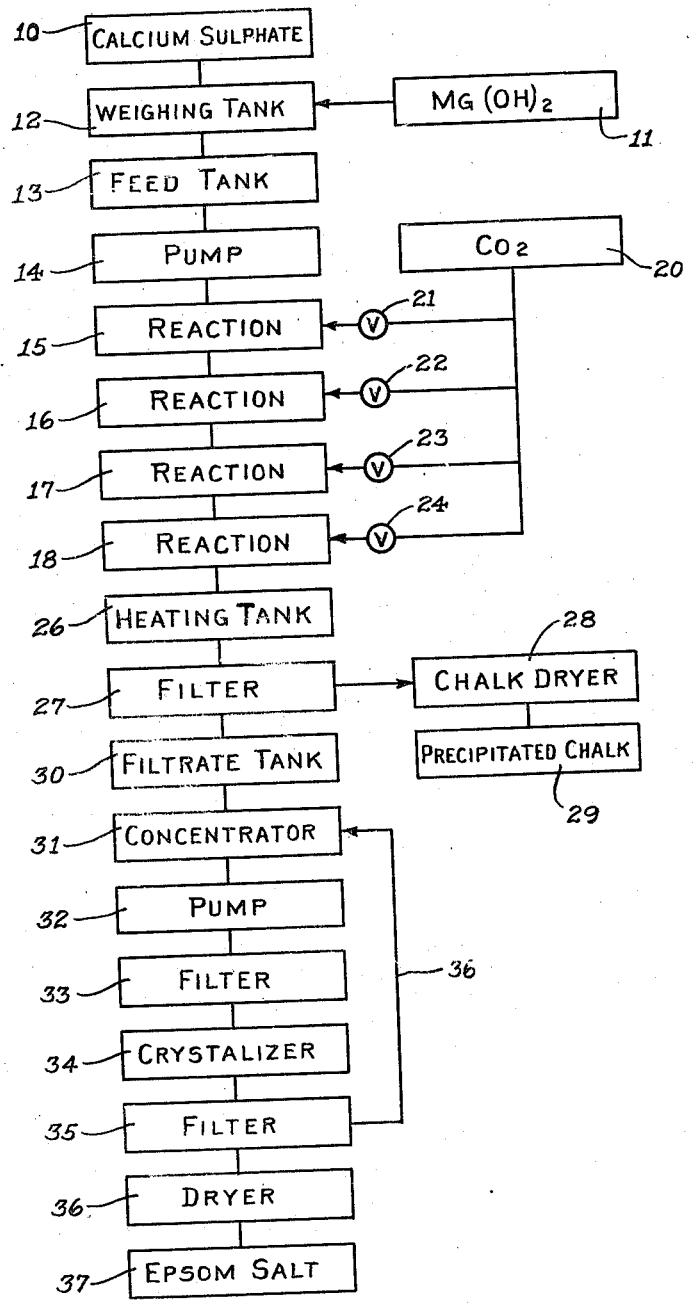

2,231,327

UNITED STATES PATENT OFFICE 2,231,327

PREPARATION OF MAGNESIUM PRODUCTS

William H. Farnsworth and Clair H. Martin, Manistee, Mich., assignors to Morton Salt Company, Chicago, Ill., a corporation of Illinois Application September 25, 1937, Serial No. 165,722

7 Claims. (Cl. 23—128)

This invention relates to the production of magnesium sulfate, or Epsom salts.

It is the principal object of the invention to provide a simple and highly effective process for the efficient production of magnesium sulfate or Epsom salts through utilization of a magnesium compound and gypsum.

It is a further object to provide a process of this character which is subjected to predetermined control to effect a high degree of completion of the reaction with the production of products of a satisfactory grade of purity.

It is a further object to provide a process of this character for the production of Epsom salts and precipitated chalk which is adapted to be carried out as either a batch or continuous process and under suitably controlled conditions to secure a high degree of completion of the reaction with resulting economy in the process and the securing of products of high quality.

Other objects and advantages will be apparent from the following description, the accompanying drawing, and the appended claims.

In the drawing the single figure is a diagrammatic representation of a flow sheet illustrative of the practicing of the present invention.

In the production of magnesium sulfate, which in its crystallized form is known as Epsom salts, utilizing gypsum and a magnesium containing compound such as magnesium hydroxide as the starting materials, the reaction may be expressed in accordance with the following equation:

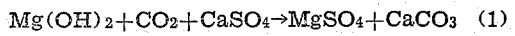

$$Mg(OH)_2 + CO_2 + CaSO_4 \rightarrow MgSO_4 + CaCO_3 \quad (1)$$

When carbon dioxide gas is added to an aqueous suspension containing magnesium hydroxide and calcium sulfate, the reaction proceeds in accordance with the foregoing, although probably in two steps as shown by the following reactions:

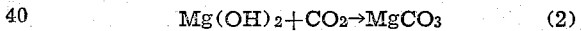

$$Mg(OH)_2 + CO_2 \rightarrow MgCO_3 \quad (2)$$
$$MgCO_3 + CaSO_4 \rightarrow MgSO_4 + CaCO_3 \quad (3)$$

This reaction tends to proceed in the direction indicated, but does not proceed to completion in that direction. Numerous experiments at different concentrations of reacting materials have indicated a definite stopping point short of completion, beyond which the reaction does not normally proceed. Thus with concentrations of the order of molar concentrations, it is found that the reaction will proceed only to approximately 70% to 73% completion, and that continued addition of carbon dioxide does not result in the reaction proceeding further toward completion. This is undesirable from the practical and operating standpoint inasmuch as it limits the yield of Epsom salts which it is possible to obtain with the reaction, and it further results in products which are insufficiently pure and therefore of definitely lessened value. This is particularly the case with the precipitated chalk ($CaCO_3$) which is contaminated with substantial quantities of the reacting ingredients and thus rendered impure and difficult to purify, and thus is of reduced value commercially.

In accordance with the practicing of the present invention a high yield of Epsom salts is secured, with the production of products of a high degree of purity, through proper control of the course of the reaction to effect the progressing thereof to a greatly improved degree of completion. Thus through the practicing of this invention applicant has found that under properly controlled conditions, the reaction may be caused to proceed to substantially 90% or better of completion, with improved efficiency of reacting materials, and with the resulting products improved from the standpoint of purity and the like. Where suitable reacting materials are used, the precipitated chalk is of high quality, of exceptionally small particle size and soft texture, and of fine white color and high degree of purity. Likewise the Epsom salts are of high quality and of exceptional purity. Furthermore this process is such that it may be carried out either on a batch or on a continuous basis, in accordance with whichever method of operation is more desirable under the particular circumstances. Its practicing moreover is not restricted to the utilization of a single magnesium compound but may be successfully practiced with magnesium compounds as customarily available, such as magnesium hydroxide and magnesium carbonate.

In the practicing of this invention it has been found important to maintain control over the reaction throughout its course so as to cause the reaction to proceed to the desired degree of completion. This control is so effected as to regulate and limit the reaction rates involved in predetermined manner to maintain free magnesium hydroxide available in solution. Thus in Equation 2 above it has been found important to so limit the rate of this reaction that it does not exceed the rate of reaction of Equation 3 as indicated above. Where thus limited, free magnesium hydroxide remains available in solution, and serves the purpose of avoiding exhaustion of magnesium hydroxide prematurely. While the initial control of the reaction is of lesser importance than the control during the latter part of the reaction, it is desired from a practical standpoint to secure proper control over the reaction at all stages to thereby avoid completely using up all available magnesium hydroxide. And it is found that the reaction will terminate and cannot be continued beyond the critical point heretofore mentioned, approximately 70% completion, when this magnesium hydroxide constituent is no longer present. It is therefore of particular importance during the stage of the reaction when the percentage of completion approaches and exceeds this critical value that proper control over the reacting conditions be maintained. It is found that both reaction rates are much more rapid during the initial portion of the reaction, and that these rates become less as the reaction proceeds to greater percentage completions. It is further found that the reaction rate of the magnesium hydroxide with carbon dioxide (No. 2 above) proceeds more rapidly than the reaction rate between the magnesium carbonate and the calcium sulfate (No. 3 above). Therefore it is the preferred practicing following the teachings of this invention to limit the reaction rate of magnesium hydroxide with the carbon dioxide, and to so control this reaction rate as to progressively limit the progress thereof, to provide for maintaining unreacted magnesium hydroxide available as such in the system.

The preferred manner of effecting limitation in the reaction rate is through control of the introduction of carbon dioxide, this forming a simple and highly effective manner of so controlling the reaction. Thus it is found that by introduction of carbon dioxide bearing gas at a relatively high rate, followed by the progressive limiting of the rate of introduction, the progress of the reaction with magnesium hydroxide is suitably controlled so as not to exceed the rate of reaction between the formed magnesium carbonate and the calcium sulfate. Where the process is practiced on a batch basis, this is conveniently effected through controlled and limited rate of introduction of carbon dioxide gas into the reacting vessel, the rate of such gas introduction being so controlled over the course of the reaction as to bring about the desired balanced conversion, and to thereby secure the high percentage completion of reaction.

It is preferred however to practice the invention on a continuous basis, and the following is given as a specific example of carrying out the invention on this basis.

Referring to the drawing which illustrates diagrammatically a flow sheet for this process, a source of calcium sulfate is shown at 10, and a source of magnesium hydroxide at 11. These materials are fed to a suitable measuring or proportioning device, shown as a weighing tank 12, from which the mixture at the proper concentration and proportions is supplied to feed tank 13. While the concentration of reacting materials may be varied over a rather wide range, it is preferred to utilize substantially molar concentrations of each ingredient for ease of handling and to facilitate separation and purification of the resulting products, and the suspension supplied to the feed tank 13 thus contains one mol $Mg(OH)_2$ and one mol $CaSO_4$ per liter. A suitable rate of supply of the suspension of approximately 8.7 gallons per minute is utilized, giving a production of about 10 tons of Epsom salts per day of 24 hours.

From the feed tank 13 the suspension is supplied to pump 14, which provides for pumping the same at the desired rate into the series of reaction tanks 15 to 18, each serially connected to the other. Each tank has a capacity of approximately 1040 gallons, and at the rate of feed above described, this provides an average retention time in each tank of 2 hours.

A source of $CO_2$ gas is shown at 20 which may be of any desirable composition varying from approximately 4% available $CO_2$ to pure carbon dioxide. A convenient source of gas for this purpose is stack gas from which ash and suspended solid particles have been removed, and which contains approximately 9% $CO_2$. The gas should also be relatively cool, a temperature of approximately 25° C. having been used satisfactorily in actual operations.

The gas is supplied by parallel lines to each of the reaction tanks 15—18, a series of control valves 21—24 providing for separate control of the respective rates of gas supply to each of the tanks, the gas being suitably distributed through and contacted with the suspension.

In order to secure the desired control of the course of the reaction, the valves 21 to 24 are preferably so adjusted as to provide for the maximum rate of flow of gas into reaction tank 15 with progressively decreasing rates of flow into each of the remaining tanks. Thus with the particular concentration of suspension as above described, highly satisfactory results have been secured where the rate of flow of gas was so controlled as to effect a conversion of approximately 50% in the first reaction tank, this proportion being increased to 75% in the second, 87.5% in the third, and approximately 93% in the fourth reaction tank. And with the gas of the character described herein, it was found that proper rates of flow for each of the 4 stages of the reaction were approximately 382, 185, 96, and 25 cubic feet per minute. These figures are given as illustrative of the practicing of the invention under particular conditions, and as representative of a high percentage of completion of the reaction which may be secured under those conditions; it will be understood however that the practicing of the invention is not restricted to these particular conditions and concentrations, and that substantial changes may be made therein while carrying out the controlled process as described herein. Also a greater or lesser number of reacting stages may be utilized, with the conditions suitably controlled to provide for the reaction progressing to the desired degree of completion. And it will be understood that when the process is operated on a batch basis, the rate of supply of carbon dioxide will be suitably controlled in a manner to provide for the proper and progressively limited rate of introduction thereinto to secure comparable results to those resulting from the continuous process.

The rate of reaction and of introduction of $CO_2$ to avoid exhaustion of free $Mg(OH)_2$ varies under different conditions of operation as regards concentrations, temperatures and the like but under the particular conditions above described it is found that satisfactory operating results on a batch basis are secured with the reaction rate so controlled as to be represented by the following equation in which $x$ is the percentage of conversion or completion of reaction and $y$ is the time in hours during which the reaction has progressed: $\log y = .01325x - .3615$. Ordinarily the rate of reaction should not materially exceed the value as expressed in order to avoid the undesirable exhaustion of free magnesium hydroxide; lower rates produce satisfactory results, the equation representing approximately the maximum rate under the particular circumstances which will result in the reaction going to the desired high degree of completion. The reaction rate need not be continuously varied to accord with this equation but may be changed periodically to approximate generally the relationship expressed. In the case of the continuous operation under the conditions described the conditions existing at the several successive stages approximate this relation. It will also be understood that under different conditions of operation the constants in the above equation will be changed.

The material leaving the reaction tank 18 passes into a heating tank 26 where the suspension is preferably heated to assist in dispelling remaining carbon dioxide gas, and to also facilitate the filtering of the chalk. Temperatures of the order of 70° to 100° C. have been found to be satisfactory for this purpose.

The heated suspension flows into filter 27 which provides for the separation of the precipitated chalk from the magnesium sulfate solution. It likewise provides for the washing of the chalk to free the same substantially entirely of magnesium sulfate, the chalk then being supplied to a chalk drier 28, from which the dried chalk is obtained at 29 as the final purified, soft, fine-textured product.

The magnesium sulfate solution flows from the filter into the filtrate tank 30 which serves as a source of supply of solution to be fed to the concentrators 31. Here the solution is concentrated in any suitable manner such as by evaporation under reduced pressure and temperature, to produce a concentration and solution temperature as desired. The concentrated solution is removed from the concentrator 31 by pump 32 and fed to filter 33 which provides for polishing and brightening the concentrated solution by removing all suspended matter therefrom. The filtrate at the necessary concentration and temperature then goes to crystallizer 34 where the desired magnesium sulfate product is crystallized out as a pure material. Filter 35 separates the crystals so formed from the mother liquor, the liquor being returned by means of line 36 to the concentrator to avoid loss of magnesium sulfate in the process. The crystals are then dried at 36 to form the source 37 of the finished crystallized Epsom salt product. As will be evident other magnesium sulfate products may be formed by suitable treatment.

Instead of carrying out the reaction through utilization of magnesium hydroxide and carbon dioxide, a previously formed magnesium carbonate may be utilized as the starting material, and suitably reacted with calcium sulfate in accordance with the following equation:

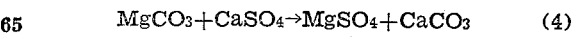

$$MgCO_3 + CaSO_4 \rightarrow MgSO_4 + CaCO_3 \qquad (4)$$

This reaction similarly is found to proceed only to an unsatisfactory degree of completion unless subjected to properly controlled conditions. Following the teachings of this invention, this reaction may likewise be caused to proceed to a much higher degree of completion, such as to make the process a commercially practicable and desirable one. In accordance with this invention it has been found that the presence of magnesium hydroxide during the course of the reaction will result in the reaction continuing to a condition of completion of approximately 90% or better. When appreciable amounts of magnesium hydroxide are present, it appears to exercise a controlling effect upon the reaction, avoiding its tendency to otherwise terminate at approximately 70% completion. While varied amounts of magnesium hydroxide have been found suitable, very satisfactory results have been secured using an amount approximately equivalent to 1% to 2% of the magnesium carbonate present. This reaction may be carried out at any reasonable concentration within the solubility of magnesium sulfate, but because of the mechanical difficulties of separating the precipitated chalk from the magnesium sulfate and washing the chalk, it is found more desirable that it be carried out at approximately a molar solution.

In accordance with this latter procedure therefore a high quality Epsom salt product may be produced making use of magnesium carbonate in place of magnesium hydroxide, with a correspondingly high precentage of completion and comparable characteristics in the resultant products.

While the processes and products herein described constitute preferred embodiments of the invention, it is to be understood that the invention is not limited to these precise processes and products, and that changes may be made therein without departing from the scope of the inventions which are defined in the appended claims.

What is claimed is:

1. A process for the production of magnesium sulfate with a high percentage conversion of in excess of about 70% which comprises forming an aqueous suspension of magnesium carbonate, reacting said formed magnesium carbonate with calcium sulfate in aqueous suspension, adding effective amounts of the order of 1% to 2% of free magnesium hydroxide based on the weight of the magnesium carbonate present in suspension to said formed magnesium carbonate and calcium sulfate in suspension, and maintaining said effective amounts of free magnesium hydroxide present during the course of the reaction and until said high percentage conversion is secured.

2. A process of forming magnesium sulfate as a continuous process with a high percentage conversion of in excess of about 70% which comprises forming a suspension of magnesium hydroxide and gypsum in water, passing said suspension continuously through a plurality of serially arranged reacting vessels having such capacity as to provide for predetermined time of retention in each vessel, passing carbon dioxide gas through said suspension in each of said vessels, and maintaining free magnesium hydroxide available in each vessel throughout the course of the reaction and until said high percentage conversion is reached by controlling the quantity of carbon dioxide introduced into each vessel to provide for decreasing the quantity supplied into each succeeding vessel.

3. A process of forming magnesium sulfate as a continuous process with a high percentage conversion of in excess of about 70% which comprises forming a suspension of magnesium hydroxide and gypsum in water, passing said suspension continuously through a plurality of serially arranged reacting vessels having such capacity as to provide for predetermined time of retention in each vessel, passing carbon dioxide gas through said suspension in each of said vessels, and maintaining free magnesium hydroxide available in each vessel through the course of the reaction by progressively limiting the quantity of carbon dioxide introduced into each vessel to avoid exhaustion of free magnesium hydroxide prior to reaching said high percentage conversion.

4. A process for forming magnesium sulfate with a high percentage conversion of in excess of about 70% which comprises forming a suspension of magnesium hydroxide and gypsum in water, passing said suspension continuously through a plurality of serially arranged reacting vessels having such capacity as to provide for predetermined time of retention in each vessel, introducing carbon dioxide gas into the suspension in each vessel, and progressively decreasing the total quantity of carbon dioxide introduced per unit quantity of suspension into each of the several reacting vessels to effect a conversion of approximately 50% in the first vessel, 75% in the second vessel, 87½% in the third vessel, and 93% in the fourth vessel, in the presence of free magnesium hydroxide available in each of the reacting vessels.

5. A process for forming magnesium sulfate with a high percentage conversion of in excess of about 70% which comprises forming a suspension of magnesium hydroxide and gypsum in water, introducing carbon dioxide gas into said suspension to secure intimate contact therewith, and controlling the rate of introduction of carbon dioxide gas to maintain free magnesium hydroxide available during the reaction period and until said high percentage conversion is reached, said rate of introduction being progressively reduced over a series of successive substantially equal time intervals in approximately the proportion of 382, 185, 96, and 25 cubic feet per minute.

6. A process for forming magnesium sulfate with a high percentage conversion of in excess of about 70% which comprises forming a suspension of magnesium hydroxide and gypsum in water, introducing carbon dioxide gas into the suspension and progressively decreasing the rate of introduction of carbon dioxide gas during the course of the reaction to effect percentage conversions of approximately 50%, 75%, 87½%, and 93% in a series of substantially equal time intervals over the course of the reaction and in the presence of magnesium hydroxide maintained available throughout the reaction and until the desired high percentage conversion is reached.

7. The process of claim 6 in which the introduction of carbon dioxide is so controlled that the percentage conversion is limited substantially in accordance with the equation $$\log y = .01325x - .3165$$

where $x$ represents the percentage of conversion and $y$ represents the time in hours during which the reaction has progressed.

WILLIAM H. FARNSWORTH.
CLAIR H. MARTIN.